Figure 1:
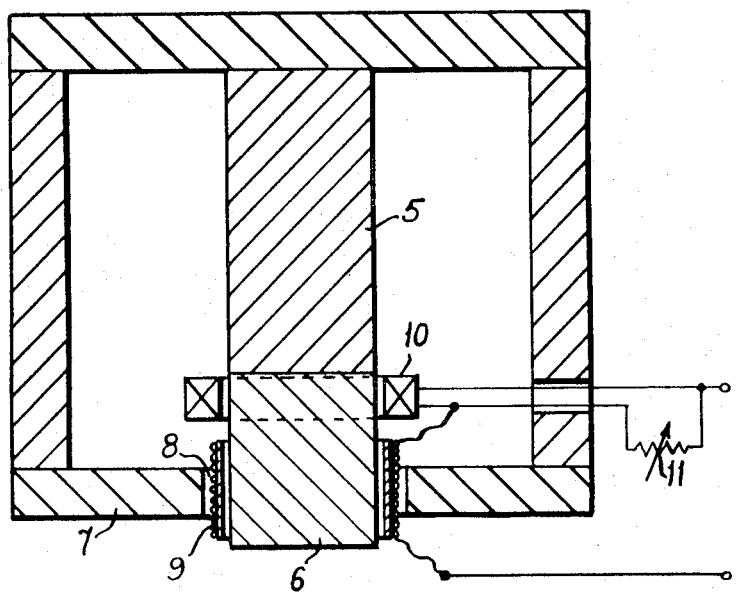

United States Patent

[11] 3,621,418

| [72] | Inventor | Bernard Stuart Baker<br>Conventry, England |
|------|----------|---------|
| [21] | Appl. No. | 849,773 |
| [22] | Filed | Aug. 13, 1969 |
| [45] | Patented | Nov. 16, 1971 |
| [73] | Assignee | Courtaulds Limited<br>London, England |
| [32] | Priority | Aug. 26, 1968 |
| [33] |  | Great Britain |
| [31] |  | 40,605/68 |

[54] TRANSDUCERS
6 Claims, 2 Drawing Figs.

[52] U.S. Cl. .................................................. 335/222, 324/146
[51] Int. Cl. .................................................. H01f 27/42
[50] Field of Search .................................... 335/222; 324/146, 132, 151, 151 A; 307/149

[56] References Cited
UNITED STATES PATENTS

| 2,736,869 | 2/1956 | Rex .............................. | 335/222 X |
| 3,088,059 | 4/1963 | Massa ........................... | 335/222 |
| 2,497,669 | 2/1950 | Haley ........................... | 324/146 |
| 2,502,369 | 3/1950 | Castner ......................... | 324/146 |
| 3,323,057 | 5/1967 | Haley ........................... | 324/117 |

FOREIGN PATENTS

| 4,000 | 1890 | Great Britain ................. | 335/222 |

*Primary Examiner*—Robert K. Schaefer
*Assistant Examiner*—William J. Smith
*Attorney*—Davis, Hoxie, Faithfull & Hapgood

ABSTRACT: A transducer comprising an electrical conductor located in the field of a permanent magnet or an electromagnet, whereby, by passing a current through the conductor, force will be caused to act between the conductor and the magnet, the transducer including a further electrical conductor connected in a circuit with the first-mentioned conductor so as to carry a current related to the current through the first-mentioned conductor and such as to tend to nullify the effect of that current to alter the field of the magnet linking the first-mentioned conductor. A transducer element is also claimed.

Inventor
BERNARD STUART BAKER
By
Davis, Hoxie, Faithfull & Hapgood    Attorney

TRANSDUCERS

The present invention relates to a transducer in which an electrical conductor is located in the field of a magnet so that on passing current through the conductor a force is caused to act between the conductor and the magnet. The magnet may be a permanent magnet or an electromagnet.

Such transducers can be used to measure an external force exerted on the conductor since the current through the conductor can be adjusted so that the force between the conductor and the magnet balances the external force. The force between the magnet and the conductor is normally directly proportional to the current through the conductor and after calibration of the transducer, the size of an external force acting on the conductor can be determined by measuring the current through the conductor under conditions of balance in which the conductor is maintained in a standard position in relation to the magnet.

In particular, transducers of this kind can be used to measure forces in tensile testing machines for textile products. When using small balancing currents to measure the small forces involved in determining the breaking strength of individual fibers good linearity of response is obtained. However, if an attempt is made to make a tensile testing machine capable of testing a wide range of types of textile products from individual fibers to tire cords, i.e., products with low strength to products with high strength, linearity of response is not maintained for those products with high tensile strength where large forces and large currents are involved. It has been found that the departure from linearity of response is due to the fact that the current in the conductor influences the magnetic field of the magnet whereas a linear response depends upon this field remaining constant. The present invention is intended to reduce this difficulty and provide a transducer of this kind with a more nearly linear response over the whole range of forces which it is capable of measuring. Linearity of response is desirable in that it is then not necessary to calibrate the transducer at more than one point of its range and, in addition, such a transducer is often required to be used in conjunction with other equipment having a linear response.

According to one aspect of the invention there is provided a transducer comprising an electrical conductor located in the field of a magnet whereby by passing a current through the conductor a force will be caused to act between the conductor and the magnet, the transducer including a further electrical conductor connected in a circuit with the first mentioned conductor so as to carry a current related to the current through the first mentioned conductor and such as to tend to nullify the effect of that current to alter the field of the magnet linking the first mentioned conductor.

According to another aspect of the invention there is provided a transducer element comprising an electrical conductor located in the field of a permanent magnet whereby by passing a current through the conductor a force will be caused to act between the conductor and the magnet, the transducer including a further electrical conductor so arranged that a current related to the current through the first mentioned conductor can be passed through it to tend to nullify the effect of the current through the first mentioned conductor in altering the field of the magnet linking the first-mentioned conductor.

The magnet in a transducer according to the invention may be a permanent magnet or an electromagnet. If the magnet is an electromagnet the normal magnet coil may, in some cases, be arranged to constitute the said further conductor and may be connected in a circuit which will pass through the coil a current component tending to nullify the effect of the current in the conductor. If a permanent magnet is used a separate compensating conductor is required.

A transducer element according to the invention will, in use, be connected to a circuit which will pass through the said further conductor a current related to the current in the first-mentioned conductor. The current through the further conductor may be the same current as that through the first mentioned conductor since, in some cases, the conductors can be connected in series.

Figure 2:
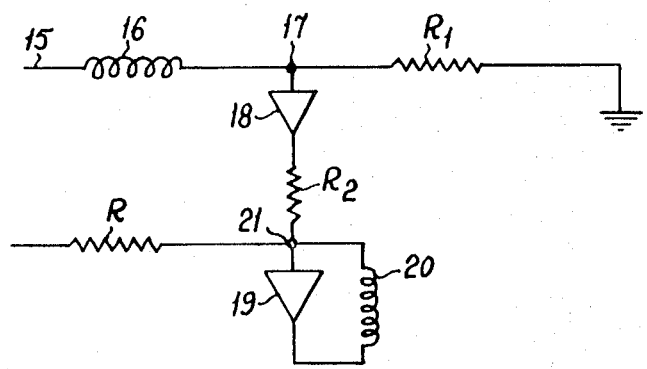

The invention will now be described, by way of example, with reference to the accompanying drawings, in which FIG. 1 is a diagrammatic sectional view of a transducer element according to the invention and a circuit in which it is connected, and FIG. 2 is a circuit diagram of a transducer according to the invention incorporating an electromagnet.

FIG. 1 shows a transducer element comprising a center pole magnet which includes a cylindrical permanent magnet 5 provided at one end with a soft iron pole piece 6. Surrounding the pole piece 6 is a further pole piece 7 in the form of an annular plate, the pole piece 6 being located concentrically with respect to the aperture in the pole piece 7 to provide an annular gap 8 in the magnetic circuit of the magnet. A conductor constituted by a force coil 9 is attached to the arm of a lever (not shown) and is located in the annular gap 8 thereby being subjected to the field of the magnet 5.

In operation, a load force is applied to the lever and the current through the coil 9 is adjusted to produce a force which balances the load thus maintaining the coil and the lever in a standard position in relation to the magnet.

As the current through the coil 9 is increased however, this current begins to have a detectable influence on the field of the magnet. Probably, the main influence of the current in the coil 9 is in the soft iron pole piece 7. In order to counteract this influence of the coil current on the field of the magnet in the region of the force coil 9 and maintain the field in which the coil 9 is located substantially unaffected by the increasing current, a compensating coil 10 is wound on the central pole piece 6 and connected in series with the force coil 9. A variable resistor 11 is connected across the compensating coil 10 so that the current through the coil can be adjusted but is always related to the current in the force coil. If the resistor 11 is made infinite, the current through the compensating coil 10 becomes the same as that through the force coil 9. In practice, the size of the resistor 11 is adjusted to give the correct compensation. Under these conditions, the ampere-turns of the force coil which are effective in influencing the magnetic field will be counterbalanced by an equal number of effective ampere-turns of the compensating coil.

In the case of a transducer having an electromagnet, it may not be necessary to include a separate compensating coil. The electromagnet can, in some cases, be connected in a circuit with the force coil in such a way that an additional current component is imposed on the current in the magnet coil thereby varying this current. The variation in the current is arranged to be such that it tends to have an effect on the magnetic field in the region of the force coil which is equal and opposite to the effect thereon of the current in the force coil.

FIG. 2 shows a transducer according to the invention incorporating an electromagnet. Current is supplied from a circuit (not shown) along a conductor 15 to a force coil 16. The circuit to which the conductor 15 is connected varies the current through that conductor so that the force between the magnet of the transducer and the force coil balances the external force applied to the transducer. In order to provide compensation for the effect of the force coil current on the field of the transducer magnet, the force coil current is passed through a resistor $R_1$. The junction 17 of the coil 16 and the resistor $R_1$ is connected through a buffer amplifier 18 and a resistor $R_2$ to a summing amplifier circuit. This circuit includes a high gain amplifier 19 and the energizing coil 20 of the electromagnet of the transducer. The coil 20 is connected as a feed back impedance from the output to the input of the amplifier 19. The input junction 21 of the amplifier also has connected to it a resistor R which is connected to a circuit supplying the main energizing current to the magnet coil 20.

The operation of the circuit is as follows. A change in the current through the coil 16 to produce a balance with an external force acting on the transducer causes a change in the voltage at the junction 17. This causes a change in the current flowing through the resistor $R_2$ but because of the characteristics of the summing amplifier circuit, the current flowing through the resistor R is not affected. However, since the current in the coil 20 is the sum of the currents in R and R, the change in the current through $R_2$ is reflected as a change in the total current flowing through the coil 20.

If the potential at the junction 17 is $e$ and the current through the force coil 16 is $i_F$, then $e$ is equal to $i_F \cdot R_1$.

If the current through the coil 20 due to this potential $e$ is $i_m$, i.e., the current through $R_2$ is $i_m$, then $i_m = e/R_2 = (i_F \cdot R_1)/R_2$; therefore $i_m/i_F = R_1/R_2$ If $T_M$ is the effective number of turns on the magnet coil 20 and $T_F$ is the effective number of turns on the force coil 16, then to achieve compensation, it must be true that $T_M \cdot i_m = T_F \cdot i_F$ i.e., $T_M/T_F = R_2/R_1$ This gives the condition for achieving compensation for the effect of the force coil current.

If it is found that the compensating current $i_m$ has been introduced into the magnet coil in the wrong direction, the amplifier 18 can be replaced by a reversing amplifier.

In a transducer having an electromagnet, it may, nevertheless be desirable or necessary to provide a further conductor to carry a compensating current in addition to or instead of passing a compensating current component through the normal magnet coil.

What is claimed is:

1. An electromagnetic transducer comprising a magnet structure including a field space, a movable electrical conductor located in a standard position in the field space of said magnet, means for applying a mechanical force from outside the transducer to the conductor tending to move the conductor from the standard position, means for passing an electric current through the conductor sufficient to exert a force on it by interaction with the field of the magnet which will return it to the standard position, a further electrical conductor arranged so that current through it will influence the field strength of said magnet in the region of said standard position, and means for passing current through said further conductor in proportion to the current through the movable conductor and in a direction such as to tend to nullify in the region of said standard position changes in the magnetic field strength caused by current passing through the movable conductor.

2. A transducer as claimed in claim 1, wherein said first mentioned electrical conductor is constituted by a coil and said magnet includes pole pieces defining an annular gap wherein said coil is located in said standard position, said transducer further comprising means mounting said coil for axial movement in said gap, said means transmitting to said coil load forces applied for measurement to said transducer.

3. A transducer as claimed in claim 5 wherein said means for supplying current to said further conductor comprises a resistor connected in series with the first mentioned conductor, said further conductor being connected in parallel with said resistor.

4. A transducer as claimed in claim 6, wherein said means for supplying current to said further conductor constituted by a winding of said electromagnet comprises: a resistor connected to carry current passing through the first mentioned conductor, a summing amplifier connected to said resistor so as to receive therefrom a current dependent on the voltage drop across said resistor, and also connected to supply current to the electromagnet, and means for supplying the energization current for said electromagnet to said summing amplifier so that the current in the electromagnet winding comprises said energization current plus a component in proportion to the current through said first mentioned conductor.

5. A transducer as claimed in claim 1, wherein the magnet is a permanent magnet.

6. A transducer as claimed in claim 1, wherein the magnet is an electromagnet and the said further electrical conductor is a winding of the electromagnet, the said current through the further electrical conductor being superimposed on the energization current through the winding and constituting only a component of the total current through the winding.

* * * * *